Oct. 18, 1938. L. W. BLAU ET AL 2,133,418
REFLECTION AMPLIFIER
Filed Oct. 15, 1932
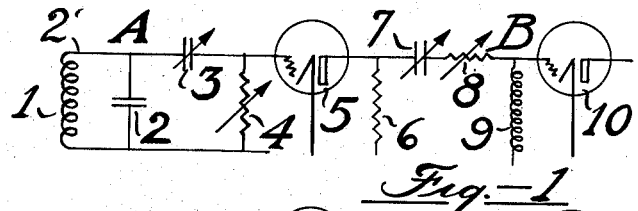 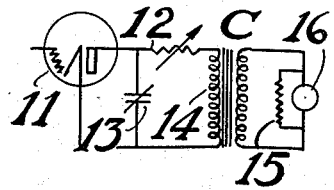
Fig.-1
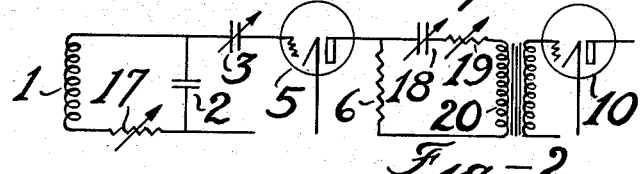 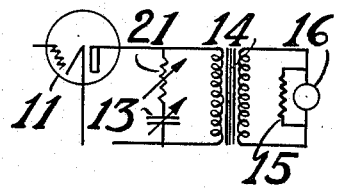
Fig.-2
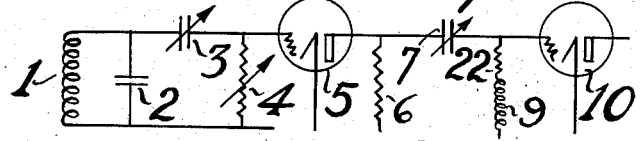 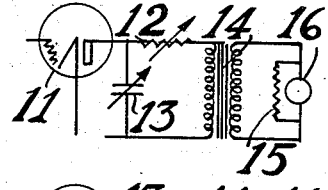
Fig.-3
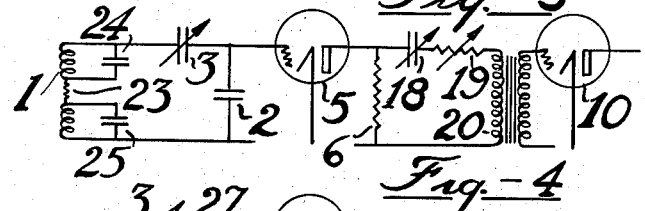 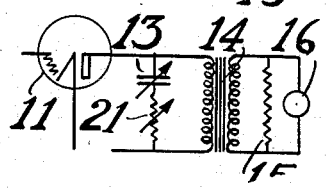
Fig.-4
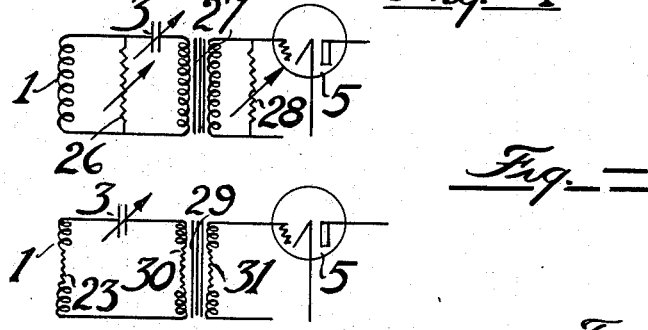
Fig.-5
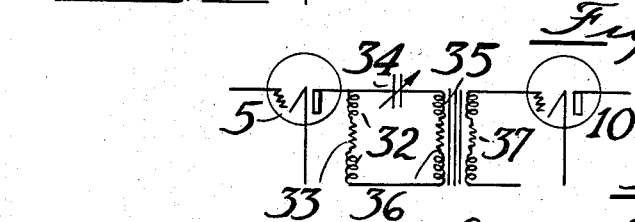
Fig.-6
Fig.-7
Ludwig W. Blau Inventor
Ralph W. Gemmer
By Attorney.
W. E. Currie Patented Oct. 18, 1938

2,133,418

UNITED STATES PATENT OFFICE 2,133,418

REFLECTION AMPLIFIER

Ludwig W. Blau and Ralph W. Gemmer, Houston, Tex., assignors to Standard Oil Development Company, a corporation of Delaware Application October 15, 1932, Serial No. 637,912

26 Claims. (Cl. 177—352)

This invention relates to improvements in apparatus for use in reflection seismology. The invention is more particularly directed to effecting the proper and appropriate damping of the individual parts of a reflection apparatus and in the elimination of obnoxious low and high frequencies. The low frequencies originate in the transverse seismic waves and the high frequencies originate in the vacuum tubes.

In reflection seismology it is important that the apparatus employed give a true record of the displacement, velocity, acceleration or of any higher derivative of the displacement of the ground. The reflected waves arrive as a rule after the direct waves. The ground is therefore disturbed when the reflected waves arrive and if the apparatus has resonant periods, these may very well obliterate the reflections. In the case of reflections from the top and bottom of thin strata it has been found that the interval between successive reflections may be as short as 0.01 second which means that frequencies in the apparatus must be damped out in less than 0.01 second.

Another difficulty in reflection seismology arises from the fact that the transverse waves have very low frequencies and high energy. These waves travel with a smaller velocity than longitudinal waves and hence the direct transverse waves arrive at about the same time as the reflections. Unless these transverse, or shear, or "tail" waves as they are sometimes called, are eliminated, they obliterate the reflections entirely. Consequently it is desirable in reflection work to employ electrical seismographs, such as a single condenser, double condenser, hot-wire, piezoelectric, or any other electric seismograph. Some preferred types of seismographs which have been found very successful are the magneto-electric seismograph such as is described in the copending application Ser. No. 626,132 of Ludwig W. Blau et al., entitled "Seismograph" filed July 29, 1932, and the double condenser seismograph described in application Ser. No. 629,262 of Ludwig W. Blau et al., filed August 18, 1932, entitled "Compound seismograph".

The invention will be fully understood from the following description taken in connection with the accompanying drawing in which latter:

Fig. 1 is a diagrammatic representation of a preferred form of input circuit, intermediate circuit and output circuit.

Figs. 2, 3 and 4 are diagrammatic representations of alternative forms of these circuits.

Figs. 5 and 6 are diagrammatic representations of alternative forms of input circuits, and Fig. 7 is a diagrammatic representation of an alternative form of intermediate circuit.

In order to simplify the figures the arrangement of A, B and C batteries is not shown since their arrangement will be obvious to any one skilled in the art.

Referring particularly to Fig. 1, the apparatus comprises an input circuit designated A, one or more intermediate circuits designated B, and an output circuit designated C. The one or more intermediate circuits B constitute one or more stages of amplification.

The input circuit comprises the inductance 1 of the coil of a magneto-electric seismograph. 2 is the distributed capacity of the cable 2' leading from the seismograph to the amplifier to be later described. A variable condenser 3 is connected in series with the inductance 1. A variable damping resistance 4 is connected in parallel with the inductance 1.

The circuit consisting of the inductance 1 and the two condensers 2 and 3 form an oscillatory system with a calculable frequency. Without the damping resistance 4 this circuit would resonate and thus the galvanometer to be later described would record the frequency of resonance. The origin of the frequency being in the circuit and not coming from the ground would cause the seismogram to be distorted. The resistance 4 functions to damp the circuit as much as desired, the smaller the resistance 4 the greater the damping. The constants are preferably so determined that frequencies below 15 cycles are eliminated entirely and frequencies between 15 and 20 cycles are partially eliminated.

The damped reflected impulses are transmitted from the input circuit to a vacuum tube 5 of the intermediate circuit B. The vacuum tube 5 is connected with a plate resistor 6, variable condenser 7, variable damping resistance 8, inductance 9 and vacuum tube 10. The elements of the intermediate stage of the reflection amplifier form an oscillatory circuit. This circuit will oscillate with a calculable frequency for values of the resistance 8, smaller than that required for critical damping. By critical damping is meant that a minimum of damping is applied to the circuit to prevent oscillation of the circuit. It is the least amount of damping which can be had upon a system without permitting oscillation of the system. Any desired degree of damping can be attained by adjusting the resistance 8. The circuit consisting of the plate resistor 6, the condensers 7, the damping resistance 8 and the inductance 9 operates in a manner similar to the circuit consisting of the inductance 1, the condenser 3, and the damping resistance 4. The impedance of the condenser 7 is very high for low frequencies, resulting in such a distribution of the voltage across the plate resistor 6 that only a small fraction of it is set up across the inductance 9 and impressed on the grid of tube 10. The intermediate circuit is different from the input circuit however in that the impedance of the inductance 9 varies directly with the frequency. This results in a decided further discrimination against low frequencies and a favoring of high frequencies.

The input and intermediate circuits permit of eliminating low frequencies by adjusting the condensers 3 and 7. This elimination of low frequencies is accomplished as follows: The electromotive force generated in the seismograph is set up across the inductance 1. The electromotive force then divides across the condenser 3 and the resistance 4 in the ratio of their respective impedances to the impedance across the coil according to Kirchhoff's law. It will be understood that the impedance (or resistance) of the resistance 4 is constant for all frequencies, while the impedance of the condenser 3 varies inversely with the frequency being infinite for frequency zero and zero for an infinite frequency. For low frequencies then, the impedance of the condenser 3 is very high and hence most of the electro-motive force across the inductance 1 is set up across the condenser 3 and only a very small fraction of it across resistance 4. Since only that part of the electro-motive force across the resistance 4 is impressed on the grid of the tube 5, it is seen that low frequencies are substantially eliminated and do not appear on the seismogram recorded by the galvanometer to be later described.

The output circuit C for the amplified reflections comprises a vacuum tube 11, a variable damping resistance 12, a variable condenser 13, a transformer 14, a recording galvanometer 16 and a damping resistance 15 for the galvanometer. The variable damping resistance 12 is connected in series with the inductance of the primary of the transformer 14 and is connected across the filament and plate of the vacuum tube 11. The variable condenser 13 is connected in parallel with the variable damping resistance 12 and the inductance of the primary winding of the transformer 14. The secondary winding of the transformer 14 is connected in series to the recording galvanometer 16. The resistance 15 connected in parallel with the winding of the galvanometer damps the galvanometer.

In the operation of vacuum tubes, obnoxious frequencies sometimes originate in the tubes due to vibrations which cause a small displacement between the elements of each tube. In reflection seismology it becomes imperative that these high frequencies be eliminated. These high frequencies are eliminated by means of the output circuit C in which the condenser 13 provides a low impedance path for high frequencies. The oscillatory circuit comprising the inductance of the primary of the transformer 14 and the variable condenser 13 is damped to any desired degree by the variable damping resistance 12. The resistance 15 functions to damp the galvanometer 16 critically.

While only one stage of amplification has been illustrated between the input and output circuits, it would be understood that any desired number of intermediate stages can be used; also fixed condensers or resistances may be used where they are shown to be variable in the figure.

Figures 2 to 7 inclusive show variations in the circuits illustrated in Fig. 1 and like parts are indicated by like reference numerals. Referring particularly to the input circuit of Fig. 2, the variable damping resistance 4 is omitted and the damping of the input circuit is here accomplished by means of a variable damping resistance 17. The variable damping resistance 17 is connected in series with the inductance 1 and condenser 3. Any desired degree of damping may be obtained by varying the resistance 17, but in this case the damping of the circuit is increased by increasing resistance 17.

The intermediate circuit B illustrated in Fig. 2 comprises the plate resistor 6 of the vacuum tube 5, a variable condenser 18, a variable damping resistance 19, a transformer 20 and the vacuum tube 10. The variable condenser 18 and variable damping resistance 19 are connected in series with the inductance of the primary winding of the transformer 20. The secondary winding of the transformer 20 is connected across the filament and grid of the vacuum tube 10.

The resistance 19 serves to damp the oscillatory circuit consisting of the condenser 18 and the inductance of the primary of the transformer 20. The damping is increased by increasing the resistance 19. In many instances the plate resistor 6 will damp this circuit sufficiently for some frequencies. Resistance 19 is connected for damping the higher frequencies. This circuit serves to eliminate or reduce low frequencies. The impedance of the condenser 18 is high for low frequencies which means that the currents of low frequencies are reduced. For higher frequencies the impedance of the condenser 18 is lower, resulting in larger currents in the primary of the transformer 20; thus low frequencies suffer a reduction of amplitude.

The output circuit C illustrated in Fig. 2 differs from the output circuit illustrated in Fig. 1 in that the variable damping resistance 12 has been eliminated and a variable damping resistance 21 is conected in series with the variable condenser 13. The variable damping resistance 21 damps the output circuit shown in Fig. 2 as effectively as the resistance 12 damps the output circuit shown in Fig. 1. However, the impedance of the condenser 13 plus the variable damping resistance 21 of Fig. 2 is greater than that of the condenser 13 alone in the circuit of Fig. 1. Therefore a greater fraction of the current is forced to travel through the primary of the transformer 14.

Referring to Fig. 3, the input and output circuits illustrated in this figure are identical with those illustrated in Fig. 1. In the intermediate circuit B of Fig. 3 the damping resistance 8 has been omitted and a variable damping resistance 22 has been connected in series with the inductance 9. This circuit is of particular utility where low frequencies are the less abundant since this circuit does not discriminate against low frequencies to the same extent as the intermediate circuit illustrated in Fig. 1.

Referring particularly to Fig. 4, the intermediate circuit B and output circuit C are identical with the corresponding circuits of Fig. 2. The input circuit of Fig. 4 comprises the inductance 1 of the coil of the seismograph as shown in Figs. 1, 2 and 3. 2 is the distributed capacity of the cable and 3 is the variable condenser; 23 is a fixed damping resistance and 24 and 25 are distributed capacities of the two windings of the coil, as will be further explained below. The fixed damping resistance 23 is wound inside of the seismograph coil 1. This is accomplished by winding one-half the required number of turns of copper wire on the coil core, then winding on such a number of turns of resistance wire, preferably of nichrome or the like, as will provide sufficient damping resistance. The coil is then completed with turns of copper wire. For example, such a coil may comprise first 35,000 turns of copper wire, then 10,000 turns of nichrome wire, and finally another 35,000 turns of copper wire, giving a total of 80,000 turns and a resistance of 246,000 ohms.

The above structure overcomes the following disadvantages. A magneto-electric seismograph having a coil with very many turns as above described is of increased utility since the inductance, and therefore the sensitivity of the coil is increased. Further, the distributed capacity of the coil which was considered negligible in the circuits illustrated in Figs. 1, 2 and 3 increases as the number of turns is increased and provides another condenser which can oscillate with the inductance 1. It is immediately apparent that this oscillatory circuit cannot be damped by either the resistance 4 of Fig. 1 or the resistance 17 in the circuit of Fig. 2, because these resistances are connected outside of the coil having the inductance 1, while the distributed capacity of the coil is inside of the coil.

Referring particularly to Fig. 5, a modified form of damped input circuit comprises the inductance 1 of the coil of the seismograph and a variable condenser 3. A variable damping resistance 26 is connected in parallel with the primary winding of a transformer 27. A variable damping resistance 28 is connected in parallel with the secondary winding of the transformer 27.

Referring particularly to Fig. 6, a further application of the principle of circuit shown in Fig. 4 is illustrated. In the circuit shown in Fig. 6, damping resistances 30 and 31 are wound in the middle of the primary and secondary windings respectively of a transformer 29. The primary winding of the transformer 29 is connected with a condenser 3, the inductance 1 of the coil of a seismograph and a fixed damping resistance 23 which is located inside the coil of the seismograph. The secondary winding of the transformer 29 is connected with the vacuum tube 5. In this manner all coil and transformer windings are damped individually.

Referring particularly to Fig. 7, a modified form of intermediate stage B is illustrated in which the plate resistor 6 shown in the circuits of Figs. 1 to 4 inclusive is replaced by a coil having an inductance 32 with a damping resistance 33 wound in the middle. The circuit comprises the vacuum tube 5, the inductance 32, the damping resistance 33, a variable condenser 34, a transformer 35 and the vacuum tube 10. The damping resistance 33 is connected with the filament and plate of a vacuum tube 5. The damping resistance 33 is connected in series with the inductance 32 of the coil. The variable condenser 34 functions to reduce low frequencies as has previously been described. The transformer 35 has a damping resistance 36 wound in the middle of the primary winding and a damping resistance 37 wound in the middle of the secondary winding. It will be understood that any one of the input, intermediate or output circuits illustrated in Figs. 1 to 7 inclusive can be used in combination with any other, in addition to the arrangement shown in Figs. 1 to 4 inclusive. Furthermore these circuits can be employed with any electric seismograph with such modifications as will immediately suggest themselves to one skilled in the art. The vacuum tubes used may include three-electrode tubes, pentodes, screen-grid tubes and the like.

By the construction described a reflection amplifier is provided which eliminates undesirable low and high frequencies and which damps all oscillatory circuits. The apparatus is damped sufficiently to permit of recording reflections which arrive very close together in point of time. Transverse waves are eliminated successfully so that the reflections can be recorded correctly in phase and amplitude of displacement, velocity, acceleration or any higher derivative of the displacement.

Various changes may be made within the scope of the appended claims in which it is desired to claim all novelty inherent in the invention as broadly as the prior art permits.

We claim:

1. In the input circuit of an amplifier, the combination of an inductance coil, a variable condenser connected in series with the coil for eliminating low frequencies, and a variable damping resistance connected in parallel with the coil for damping the natural oscillations of the circuit.

2. In an amplifying circuit, the combination of an inductance coil, a variable condenser connected in series with the coil for eliminating low frequencies, and a damping resistance wound inside of the coil and in series therewith for damping the natural oscillations of the circuit.

3. In the input circuit of an amplifier, an inductance coil, a variable condenser for eliminating low frequencies, and the inductance of the primary winding of a transformer all connected in series, and damping resistances wound inside of the primary and secondary windings of the transformer, each resistance in series with the corresponding winding for damping the natural oscillations of the circuit.

4. In reflection shooting in which earth vibrations of different frequencies are produced, apparatus for recording the reflected earth waves, which comprises means for transforming the earth vibrations into their corresponding pulsations of electric energy of mixed high and low frequencies, means for passing the pulsations into an oscillatory system adapted to resonate, means for eliminating the low frequency pulsations and the high frequency vibrations, means for damping the oscillations generated in the system, means for passing the desired pulsations due to reflected waves through the system, and means for recording the reflected wave pulsations.

5. In reflection shooting in which earth vibrations of different frequencies are produced, apparatus for recording the reflected earth waves, which comprises means for transforming the earth vibrations into their corresponding pulsations of electric energy of mixed high and low frequencies, means for passing the pulsations into an oscillatory system adapted to resonate, means for eliminating the low frequency pulsations and the high frequency vibrations, means for damping the oscillations generated in the system, means for passing the desired pulsations due to reflected waves through the system, means for amplifying the reflected wave pulsations, and means for recording the reflected wave pulsations.

6. In reflection shooting in which earth vibrations of different frequencies are produced, apparatus for recording the reflected earth waves, which comprises means for transforming the earth vibrations into their corresponding pulsations of electric energy of mixed high and low frequencies, means for passing the pulsations into an oscillatory system adapted to resonate, means for eliminating the low frequency pulsations and the high frequency vibrations, means for damping the oscillations generated in the system, means for passing the desired pulsations due to reflected waves through the system, means for amplifying the reflected wave pulsations, means for damping out any obnoxious high frequency pulsations generated in the amplifying system, and means for recording the reflected wave pulsations.

7. In an amplifier, an inductance coil, a variable condenser for eliminating low frequencies, and the inductance of the primary winding of a transformer all connected in series, and a damping resistance connected in parallel with the primary winding for damping the natural oscillations of the circuit.

8. In the input circuit of an amplifier, an inductance coil, a variable condenser for eliminating low frequencies, and the inductance of the primary winding of a transformer all connected in series, the transformer having a secondary winding, and damping resistances connected in parallel with the primary and secondary windings respectively for damping the natural oscillations of the circuit.

9. In the input circuit of an amplifier, an inductance coil, a variable condenser for eliminating low frequencies, and the inductance of the primary winding of a transformer all connected in series, the transformer having a secondary winding, a damping resistance wound inside of and connected in series with the inductance coil for damping the natural oscillations of the circuit, and damping resistances wound inside of the primary and secondary windings of the transformer, each resistance being connected in series with the corresponding winding for damping the natural oscillations of the circuit.

10. In the input circuit of an amplifier, an inductance coil, a variable condenser for eliminating low frequencies, and the inductance of the primary winding of a transformer all connected in series, the transformer having a secondary winding, a damping resistance wound inside of the inductance coil and in series with the coil for damping the natural oscillations of the circuit, and a damping resistance wound inside of one of the windings of the transformer and connected in series with the winding for damping the natural oscillations of the circuit.

11. In an intermediate stage of an amplifier, a variable condenser for eliminating low frequencies, a variable damping resistance for damping the natural oscillations of the stage, and the inductance of the primary winding of a transformer, all connected in series.

12. In an amplifier, a variable condenser for eliminating low frequencies, a variable damping resistance for damping the natural oscillations of the stage and an inductance coil the impedance of which varies directly with the frequency, all connected in series.

13. In an intermediate stage of an amplifier, a three-electrode vacuum tube having a plate resistor and a grid, a variable condenser for eliminating low frequencies and a second three-electrode vacuum tube having a filament all connected in series, and a unit connected in parallel with the tubes comprising a variable damping resistance for damping the natural oscillations of the circuit connected in series to an inductance coil the impedance of which varies directly with the frequency.

14. In an intermediate stage of an amplifier, an inductance coil, a variable condenser for eliminating low frequencies, and the inductance of the primary winding of a transformer all connected in series, and a damping resistance wound inside of the inductance coil in series with the coil for damping the natural oscillations of the circuit.

15. In an intermediate stage of an amplifier, a variable condenser for eliminating low frequencies connected in series with the inductance of the primary winding of a transformer, the transformer having a secondary winding, and a damping resistance wound inside of and connected in series with one of the windings of the transformer for damping the natural oscillations of the circuit.

16. In an intermediate stage of an amplifier, a variable condenser for eliminating low frequencies connected in series to the inductance of the primary winding of a transformer, the transformer having a secondary winding, and damping resistances wound inside of the primary and secondary windings of the transformer, each resistance being connected in series with the corresponding winding for damping the natural oscillations of the circuit.

17. In an amplifying circuit, a damping resistance for damping the natural oscillations of the circuit connected in series to the inductance of the primary winding of a transformer, and a variable condenser connected in parallel with the primary winding for eliminating high frequencies.

18. In an amplifying circuit, a damping resistance for damping the natural oscillations of the circuit connected in series to the primary winding of a transformer, a recorder connected in series with the secondary winding of the transformer, a variable condenser for eliminating high frequencies connected in parallel with the primary winding, and a damping resistance for damping the recorder critically connected in parallel with the recorder.

19. In the output circuit of an amplifier, a unit comprising a variable condenser for eliminating high frequencies connected in series with a damping resistance for damping the natural oscillations of the circuit, the unit being connected in parallel with the inductance of the primary winding of a transformer.

20. In the input circuit of an amplifier, an inductance coil connected in series with a damping resistance for damping the natural oscillations of the circuit, and a condenser for eliminating low frequencies connected in parallel with the coil.

21. In an amplifying circuit, an inductance coil, a variable condenser for eliminating low frequencies and a variable damping resistance for eliminating the natural oscillations of the circuit all connected in series with the grid and filament of a three-electrode vacuum tube having a plate resistor, a variable condenser for eliminating low frequencies, and a variable damping resistance for damping the natural oscillations of the circuit connected in series between the plate resistor and the grid and filament of a second three-electrode vacuum tube, an inductance coil connected in parallel with the vacuum tube the impedance of which coil varies directly with the frequency whereby low frequencies are eliminated and high frequencies are passed through the circuit, a damping resistance for damping the natural oscillations of the circuit, and a variable condenser for eliminating high frequencies connected in series with the primary winding of a transformer and the plate resistor and filament of the last mentioned tube, and a recorder connected in series with the secondary winding of the transformer.

22. In an amplifying circuit, an inductance coil and a variable condenser for eliminating low frequencies connected in series with the grid and filament of a three-electrode vacuum tube having a plate resistor, a damping resistance connected in parallel with the inductance coil for damping the natural oscillations of the circuit, a variable condenser for eliminating low frequencies and a damping resistance for damping the natural oscillations of the circuit connected in series with the plate resistor and filament of the first mentioned tube and the grid and filament of a second tube, an inductance coil connected in parallel with the tubes the impedance of which coil varies directly with the frequency whereby low frequencies are eliminated and high frequencies are passed through the circuit, a damping resistance for damping the natural oscillations of the circuit connected in series with the plate resistor and filament of the last mentioned tube and the primary winding of a transformer, a variable condenser connected in parallel with the primary winding for eliminating high frequencies, and a recorder connected in series with the secondary winding of the transformer.

23. A method of geological exploration including the steps of creating elastic waves at or near the earth's surface, generating varying electromotive forces in sympathy with the waves produced and resulting from various subsurface geological formations, selecting an electromotive force of a desired frequency range and recording the voltage variation thereof.

24. A method of geological exploration including the steps of generating vibrations in the earth's crust, generating electric currents substantially in sympathy with said vibrations, rejecting undesirable high frequency currents, and recording the resulting current fluctuations.

25. A method of geological exploration including the steps of generating vibrations in the earth's crust, generating electric currents substantially in sympathy with said vibrations, rejecting undesirable low frequency currents and recording the resultant current fluctuations.

26. A method of geological exploration including the steps of generating vibrations in the earth's crust, generating electrical currents substantially in sympathy with said vibrations, rejecting undesirable low frequency currents, rejecting undesirable high frequency currents and recording the resultant current fluctuations.

LUDWIG W. BLAU.
RALPH W. GEMMER.